Patented Oct. 3, 1922.

1,430,670

UNITED STATES PATENT OFFICE.

JOHN H. MORGAN, SR., AND JOHN H. MORGAN, JR., OF RACINE, WISCONSIN.

FOOD PRODUCT.

No Drawing. Application filed September 20, 1919. Serial No. 325,156.

*To all whom it may concern:*

Be it known that we, JOHN H. MORGAN, Sr., and JOHN H. MORGAN, Jr., citizens of the United States, and residents of Racine, in the county of Racine and State of Wisconsin, have invented certain new and useful Improvements in Food Products; and we do hereby declare that the following is a full, clear, and exact description thereof.

Our invention relates to new and useful improvements in food products, more particularly of that type adapted to be placed on the market in cooked form.

It is primarily the object of our invention to provide a food product which possesses a palatable and novel flavor and which has its various constituents so balanced as to constitute a complete diet and to facilitate its ready digestion.

It is further our object to provide a food product which will remain fresh and maintain a desired crispness for a maximum length of time, and more particularly wherein the fatty constituents of the food product are effective to prevent spoiling action of moisture.

A still further object is to utilize the economical nutritive values of the soy bean in a food product of the present character.

With the above and other objects and advantages in view, our invention resides in the novel operative steps and combinations of ingredients hereinafter more fully described.

In the preparation of our improved food product, we first add a batch of selected and washed soy beans to a kettle of boiling water in the proportion of twelve pounds of soy beans to sixteen gallons of water. The water and soy beans are then boiled for about one and three-quarters hours and two pounds of selected and washed rice are added, the boiling operation being continued. Shortly after addition of the rice three-eighths of a pound of salt is added. The boiling operation is continued for a period of about three hours from the time of placing the soy beans in the boiling water, the batch being stirred from time to time. The kettle is preferably covered from the time of adding the soy beans until shortly after adding the rice, the cover being then left off to facilitate evaporation of the water. At the end of the boiling operation the rice has been reduced practically to a paste which is impregnated with the fatty extract of the soy beans, and this is distributed as a coating over the softened beans. This mass is then spread out in thin layers on suitable pans and cooled, the pans being placed in an oven to procure a sufficient evaporation of the moisture to reduce the mass to a proper consistency. The mass is then squeezed out through narrow slots to form flakes and the flakes are toasted to dry and finish the product and to improve the flavor and digestibility thereof.

The flakes are then packed into suitable containers for the market, and so packed will indefinitely maintain their desired crispness and freshness. This continued freshness is particularly due to the preservative action of the fatty constituents of the soy bean, which impregnates the flakes. The food product prepared in the foregoing manner and proportions has approximately the following analysis:

| | |
|---|---|
| Water | 10.45 |
| Protein | 30.74 |
| Fat | 15.46 |
| Carbohydrates | 14.50 |
| Nitrogen free extract | 26.14 |
| Ash | 2.68 |
| | 99.97 |

The product thus affords a balanced feed and its high percentage of readily assimulated protein lends it high value as a tissue building food.

While we have described a preferred embodiment of our invention, it will be appreciated that variations of operative steps and proportions within certain limits may be employed without departing in any manner from the spirit of our invention, as defined by the accompanying claims, the legume constituents, soy beans, constituting essentially a material having a fatty component to which the cereal, rice, is added to afford the proper balance of carbohydrates.

What is claimed is:

1. A ready cooked food product comprising toasted flakes made from a mixture of soy beans, rice and salt, substantially in the proportions specified.

2. A ready cooked food product comprising toasted flakes containing a homogeneous mixture of soy beans, rice and salt, substantially in the proportions specified.

In testimony that we claim the foregoing we have hereunto set our hands at Racine, in the county of Racine and State of Wisconsin.

JOHN H. MORGAN, Sr.
JOHN H. MORGAN, Jr.